United States Patent [19]

Heaton et al.

[11] 4,175,977

[45] Nov. 27, 1979

[54] PROCESS FOR PRODUCING A FLOWABLE, HIGHLY PIGMENTED, LOW VISCOSITY, HOT-MELT COATING COMPOUND

[75] Inventors: Michael J. Heaton; James R. Quick, both of Warwick, N.Y.

[73] Assignee: International Paper Company, New York, N.Y.

[21] Appl. No.: 834,089

[22] Filed: Sep. 19, 1977

[51] Int. Cl.$^2$ .................. C08J 3/22; C08L 91/06
[52] U.S. Cl. ...................... 106/272; 260/28.5 R; 260/28.5 AV; 260/37 R; 260/37 N; 260/42.56; 260/95 R
[58] Field of Search ............ 106/272; 260/28.5, 42.56, 260/37 N, 37 R

[56] References Cited

U.S. PATENT DOCUMENTS

| | | | |
|---|---|---|---|
| 3,248,359 | 4/1966 | Maloney | 260/41 |
| 3,385,808 | 5/1968 | von Bonin et al. | 260/42.56 |
| 3,418,270 | 12/1968 | Traub | 260/42.56 |
| 3,594,342 | 7/1971 | Ratzsch et al. | 260/28.5 |
| 3,629,171 | 12/1971 | Kremer et al. | 260/23.7 B |
| 3,690,297 | 9/1972 | Dentch et al. | 118/410 |
| 3,691,120 | 9/1972 | Suski et al. | 260/27 EV |
| 3,723,169 | 3/1973 | Guastella et al. | 427/179 |
| 3,745,054 | 7/1973 | Smedberg | 161/67 |
| 3,758,431 | 9/1973 | Taft et al. | 260/27 |
| 3,911,191 | 10/1975 | Guastella et al. | 428/342 |

FOREIGN PATENT DOCUMENTS 582093 9/1946 United Kingdom .
906973 9/1962 United Kingdom .

Primary Examiner—Theodore Morris
Attorney, Agent, or Firm—Jay S. Cinamon

[57] ABSTRACT

A process for preparing a flowable, nonaqueous, solvent-free highly-pigmented, low viscosity, thermoplastic, hot-melt coating compound, which comprises the steps of: (a) mixing in an initial stage from about 70% to about 95%, by weight, of pigment with from about 5% to about 30%, by weight, of low viscosity thermoplastic binder material for a period of time sufficient to obtain a homogeneous concentrate; and (b) mixing in one or more subsequent stages the homogeneous concentrate of step (a) with sufficient additional amounts of low viscosity thermoplastic binder material to yield a final homogeneous, flowable compound comprising from about 30% to about 70%, by weight, of pigment and from about 30% to about 70%, by weight, of low viscosity thermoplastic binder material.

6 Claims, 6 Drawing Figures

PROCESS FOR PRODUCING A FLOWABLE, HIGHLY PIGMENTED, LOW VISCOSITY, HOT-MELT COATING COMPOUND

BACKGROUND OF THE INVENTION

This invention relates to a process of preparing a flowable, nonaqueous, solvent-free, highly-pigmented, low viscosity, thermoplastic, hot-melt coating compound, the compounds themselves, and substrates coated with said compounds. More particularly, it relates to a method of dispersing relatively large quantities of pigment in a thermoplastic matrix to permit the resulting compound to be applied as a coating to a variety of substrates utilizing known methods of applying hot-melt coating compounds. Further, it relates to a method of preparing highly-pigmented, thermoplastic hot-melt coating compounds that can be applied to cellulosic substrates in web form at economically attractive low coating weights and high coating speeds.

A variety of techniques are known for effecting the dispersion of large quantities of pigment in water-based and solvent-based coating compositions, and techniques are also available for dispersing pigments at high concentrations in compositions containing low viscosity materials, such as plasticizers, reactive monomers and other diluents. However, the dispersion of high loadings of pigment in a thermoplastic matrix in the absence of water or solvent or a low molecular-weight diluent has generally proven difficult. The known methods for the incorporation of pigments into thermoplastic matrices all suffer from a number of disadvantages which have hindered the development of pigmented compounds and their application to a variety of uses. The development of pigmented hot melt coatings also has been hampered by the fact that only low levels of pigment can be added, usually less than about 20%, unless the composition contains a diluent to maintain a coatable consistency. Another disadvantage has been that hot melt coating compounds containing high pigment loadings can generally be applied only at relatively high coating weights, for example in excess of 15 grams of material per surface per square meter of coated paper. Another disadvantage is that this type of coating compound can only be applied at relatively low coating machine speeds, less than 35 meters per minute.

Guastella, et al., U.S. Pat. Nos. 3,723,169 and 3,911,191, both assigned to Blandin Paper Company, each disclose that a diluent-free, hot-melt compound, having a pigment content of at least 50%, by weight, can be employed in the coating of paper. However, these coating formulations, which are prepared by simply mixing the ingredients together, are not of a flowable consistency since their melt viscosities would be in the millions, if they were measurable, and they can only be applied by employing unconventional coating equipment, such as the combination of an extruder and a rigid coating blade disclosed in Dentch, et al., U.S. Pat. No. 3,690,297, also assigned to Blandin Paper Company.

SUMMARY OF THE INVENTION

It has now been discovered that the problems and disadvantages heretofore associated with the production and application of pigmented hot-melt coating compounds can be avoided by the novel and unobvious process of the present invention and the compound produced thereby. The process, which provides a means for preparing a flowable, nonaqueous, solvent-free, highly-pigmented, low viscosity, thermoplastic, hot-melt coating compound comprises the steps of: (a) mixing in an initial stage from about 70% to about 95%, by weight, of pigment with from about 5% to about 30%, by weight, of low viscosity thermoplastic binder material for a period of time sufficient to obtain a homogeneous concentrate; and (b) mixing in one or more subsequent stages the homogeneous concentrate of step (a) with sufficient additional amounts of low viscosity thermoplastic binder material to yield a final homogeneous, flowable compound comprising from about 30% to about 70%, by weight, of pigment and from about 30% to about 70%, by weight, of low viscosity thermoplastic binder material.

By utilizing the process of the present invention, there is prepared in the absence of water or solvent, a novel hot-melt coating compound which contains from about 30% to about 70% pigment, by weight, and which has sufficiently low viscosity in a molten state to permit it to flow readily and, thus, renders it capable of being employed in a wide variety of standard coating applications. In addition, the coating compounds attainable by the present process, being of low viscosity and flowable consistency, can be applied to a broad spectrum of cellulosic and noncellulosic substrates using conventional coating equipment, while operating at the high machine speeds associated with the paper industry. Further, paper so coated has the desired high degree of opacity and whiteness due to the high pigment level in the coating, and the coating also exhibits good physical properties, e.g., flexibility and scuff resistance. It is important to note that since the process of the present invention, and hence its product, employs neither water nor solvent, the difficulties encountered when using those materials in coating are eliminated. A major difficulty with using water-based coatings is that they require large capital expenditures for the purchase, installation and upkeep of extensive drying equipment. Solvent-based coating require expensive equipment to remove the solvent fumes which represent both a health and fire hazard and the solvent itself represents a considerable additional expense.

The process and product of the present invention represent a truly unexpected discovery. It is well-known that the preparation of a pigment-rich preblend, i.e., a pigment concentrate, is an effective method of improving the dispersion of a pigment in a thermoplastic binder. Since improved pigment dispersion involves a greater degree of interfacial contact between pigment and binder, one would expect such improved dispersion to result in higher viscosities. However, contrary to logical expectations, the use of the mixing process of the present invention, which involves initially preparing a pigment concentrate, followed by one or more subsequent mixing stages, has resulted in hot-melt coating compounds having significantly lower viscosities than compounds prepared by simply mixing the components together simultaneously in a single mixing stage.

The present process requires the utilization of a mixing device capable of delivering much higher shearing forces than are necessary in the simple one-stage mixing processes of the prior art. The lowest final viscosity for a given compound results when the composition of the initial stage is adjusted so that the shearing forces required for mixing are as high as possible. The rheological characteristics of the final compound or composition are determined largely by the high-shear conditions, i.e., pigment levels between 70% and 95%, prevailing during the initial stage of the process.

DETAILED DESCRIPTION OF THE INVENTION

Figure 1:
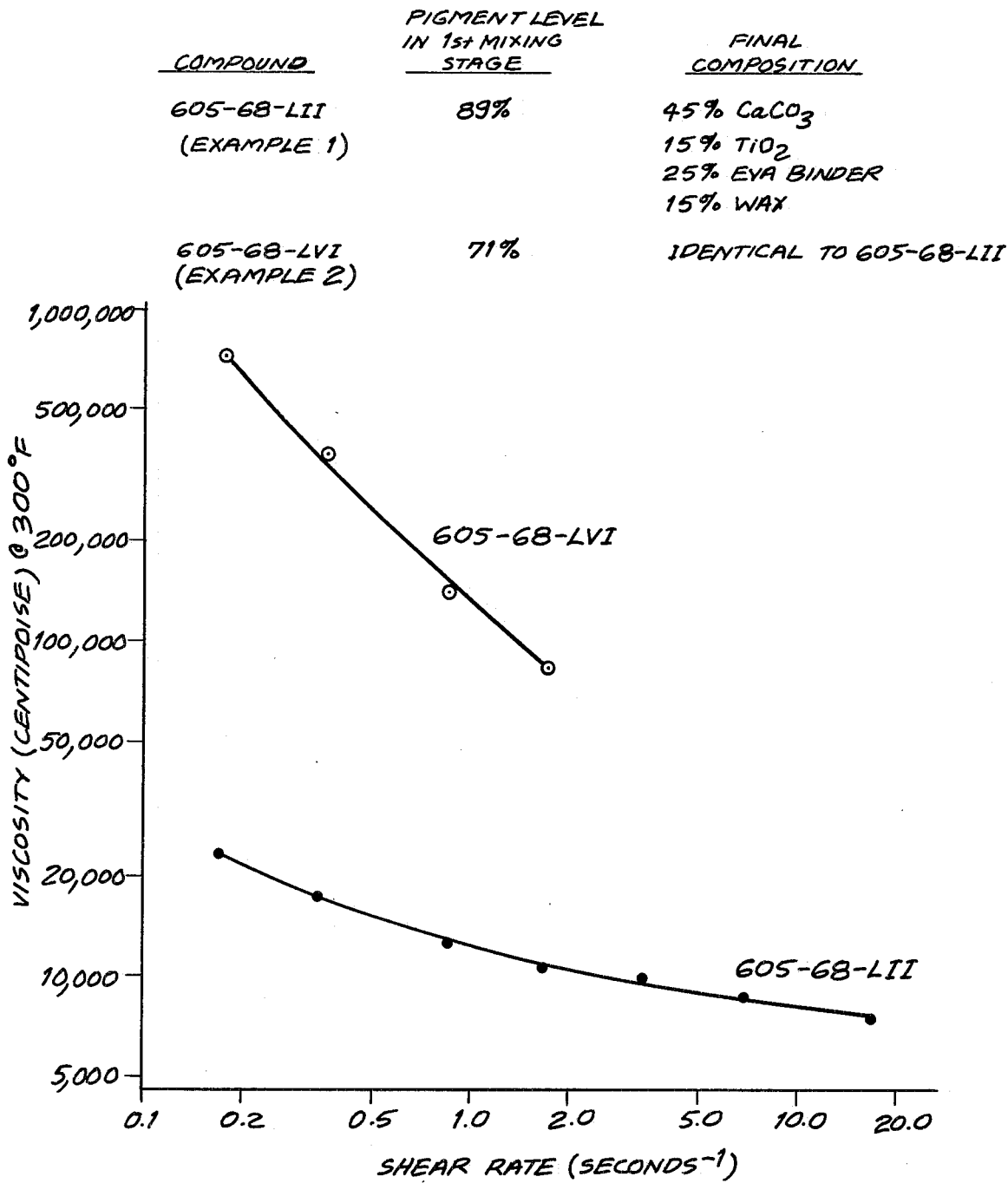
FIG. 1 is a graph of the viscosity versus shear rate data in Table I of Example 1 and Table II of Example 2.

In accordance with the process of the present invention, essentially all of the pigment content present in the final thermoplastic hot melt coating compound must be added in the initial mixing stage. It is essential that the pigment content of the first stage concentrate be at least 70%, by weight, preferably 80%, or above, and most preferably 90%, or above, to insure conditions of adequately high shear. The remainder of the first stage concentrate consists of a low viscosity thermoplastic binder. Optionally, functional materials which may be required for specific end-product applications can also be added during the first stage.

The pigment, thermoplastic binder and other functional materials are mixed during the initial and subsequent stages in a suitable high-torque mixing device, such as a double-arm, kneader-type batch mixer, for a period of time sufficient to obtain homogenity. While at least two mixing stages are necessary in the present process, a total of three, four, five, six or more stages may be employed as dictated by the desired composition of the final compound. The time period necessary to achieve homogenity is dependent upon the nature of the pigment(s) and binder(s) employed.

Exemplary of the pigments which can be employed in the process of the present invention are: titanium dioxide, calcium carbonate, clays, zinc oxide, antimony oxide, talc, silica, or mixtures thereof. It is preferred to employ one of the aforementioned pigments, or a mixture thereof, which has been processed to make it readily dispersible in the thermoplastic binder. One such process involves chemically treating the surface of the pigment particles to render them hydrophobic, as opposed to their natural hydrophyllic state. Another process simply involves grinding the pigments in the dry state to break up the pigment agglomerates. It is especially preferred to employ titanium dioxide, either alone or in admixture with calcium carbonate, which has been processed to render it more readily dispersible.

The thermoplastic resin binders used in the process of the present invention must have low melt viscosities. In the context of the present process, binders with low melt viscosities will have melt viscosities of less than about 100,000 centipoises as measured by a Brookfield Thermosel ® viscometer system at a temperature in the range of about 250° F. to about 300° F., and a shear rate of from about 0.2 to about 2.0 reciprocal seconds. Preferably, the binders should have viscosities less than 50,000 centipoises. Thermoplastic binders having viscosities as low as 1 centipoise can also be employed.

Exemplary of the low viscosity thermoplastic resin binders which can be employed in the process of the present invention are: polyethylene, ethylene-vinyl acetate copolymers, ethylene-organic acid copolymers, ethylene-vinyl acetate-organic acid terpolymers, polypropylene, polystyrene, polyamides, paraffin wax, microcrystalline wax, polyterpene resins, and mixtures thereof. Polyethylene and ethylene-vinyl acetate copolymers are preferred. All of these resins and others that are well known in the field of hot melt coating are available in low-viscosity grades suitable for use in the process disclosed herein.

The same low viscosity thermoplastic binder used in the first or initial mixing stage can also be employed in the second mixing stage, as well as any subsequent stages. Alternatively, one can use a binder in the second stage which is different from that employed in the first stage. Further, mixtures of binders can be employed in each mixing stage. As a result of experimentation it has been found preferable to employ the binder having the highest melt viscosity in the initial mixing stage, when different binders are used in succeeding mixing stages, since it adds to the condition of high shear created by the high pigment loading.

During any stage of the mixing process other functional materials which can be added to the coating formulation include: antioxidants, viscosity depressants, UV brighteners, flow modifiers and blowing agents.

The final hot melt coating compound should have a melt viscosity as measured by the Brookfield Thermosel ® viscometer system of less than about 200,000 centipoises, preferably less than about 50,000 centipoises, and even more preferably under 20,000 centipoises, at a temperature in the range of about 250° F. to about 300° F., and at a shear rate of from about 0.2 to about 2.0 reciprocal seconds. These viscosity specifications are based on the capabilities of conventional hotmelt coating machines.

The hot melt formulations prepared in accordance with the present process can be employed in the coating of various cellulosic and non-cellulosic substrates, such as bleached board for folding cartons, label stock, unbleached kraft linerboard, publication paper, aluminum foil, mylar film, newsprint, etc. Various methods for applying the hot melt formulations can be utilized, including slot-orifice coating, blade coating, spray coating, brush coating and various roll coating techniques, such as transfer, reverse, kiss and gravure coating.

The low viscosity coating formulations prepared by the present process permit application at low coating weights and at high machine speeds. By using these low viscosity coating compounds there can be applied from over 10 pounds per surface per ream (3000 ft.$^2$) of paper down to about one-half pound per surface per ream of paper. Truly, there is no maximum weight level, since in each instance the amount to be coated is dependent upon the degree of opacity and whiteness sought to be attained. Use of these formulations permit application at coating machines speeds in excess of 200 lineal feet per minute, and even permits speeds of up to 1,000 lineal feet per minute, or above.

In order to disclose more clearly the nature of the present invention, the following examples illustrating the invention are given. It should be understood, however, that this is done solely by way of example and is intended neither to delineate the scope of the invention nor limit the ambit of the appended claims.

EXAMPLE 1

The mixing device used in this Example and Examples 2, 3, 4, 8 and 9 which follow is a one gallon "AMK Kneader-Extruder" supplied by Aachener Misch-und Knetmaschinenfabrik Peter Kupper in West Germany. The Kneader-Extruder is a double-arm, kneader-type batch mixer with a discharge auger at the bottom of the mixing chamber and with a jacket surrounding the mixing chamber for circulating heating or cooling fluids. In this experiment, pressurized hot water at 250° F. was circulated through the jacket.

In this Example and Examples 2, 3 and 4 the particular batch of material under discussion in each case is one of a series of batches all of which have the same final composition. In these series, the successive batches are prepared with a small amount of material from the preceding batch remaining in the Kneader-Extruder. Thorough cleaning of the Kneader-Extruder between successive batches of the same composition is not practical because the machine would have to be partially dismantled in order to thoroughly clean the discharge auger located at the bottom of the mixing chamber. Since this residual material is, in each case, of the same composition as the batch under preparation, the final composition of the batch is not affected by the residual material. However, the residual material does affect the composition of the material in the mixer during the initial stage of mixing. It is to be understood that the composition given for the initial charge of material in this Example and in Examples 2, 3 and 4 is an accurate account of the new material charged to the mixer, although the exact composition of material present during the initial mixing stage will be somewhat different since the new material is immediately combined with the small residue from the preceding batch.

Initially, the following materials were charged to the Kneader-Extruder at a gradual rate:

| Initial Charge | |
|---|---|
| 375 gm | Elvax ® 310 |
| 750 gm | Titanox ® 2071 |
| 2250 gm | Purecal ® SC |

Elvax ® 310 is an ethylene-vinyl acetate copolymer made by the DuPont Company. Titanox ® 2071 is a surface-treated titanium dioxide made by NL Industries. Purecal ® SC is a surface-treated calcium carbonate made by BASF-Wyandotte.

The initial charge, which contained 89%, by weight, of pigment, was mixed until a homogeneous state had been achieved for the concentrate.

To the concentrate there was then added 375 gms of Elvax ® 310. Thereafter, 500 gms of A-C ® 400, an ethylene-vinyl acetate copolymer made by Allied Chemical, was added at a gradual rate so as to avoid creating two (2) phases in the mixer; and finally 750 gm of paraffin wax, having a melting point of 165° F., was added. The contents were mixed until a homogeneous state was achieved. The percentage composition of the final compound was as follows:

| Purecal ® SC | 45% |
|---|---|
| Titanox ® 2071 | 15% |

-continued

| Elvax ® 310 | 15% |
|---|---|
| A-C ® 400 | 10% |
| Paraffin wax (165° F. m.p.) | 15% |
| | 100% |

Using a Brookfield Thermosel ® system, which includes a Brookfield viscometer, the melt viscosity of the final compound was determined at a temperature of 300° F. and a range of shear rates. The viscosity data are given in Table I.

Table I

| (Compound 605-68-LII) | |
|---|---|
| Shear Rate (sec$^{-1}$) | Viscosity @ 300° F. (centipoise) |
| 0.17 | 23,000 |
| 0.34 | 17,500 |
| 0.85 | 13,000 |
| 1.7 | 11,000 |
| 3.4 | 10,000 |
| 6.8 | 9,000 |
| 17.0 | 7,900 |

EXAMPLE 2

Using the same one gallon AMK Kneader-Extruder employed in Example 1, the following materials were initially charged at a gradual rate of addition.

| Initial Charge | |
|---|---|
| 750 gm | Elvax ® 310 |
| 500 gm | A-C ® 400 |
| 750 gm | Titanox ® 2071 |
| 2250 gm | Purecal ® SC |

The initial charge, which contained 71%, by weight, of pigment, was mixed until a homogeneous state had been achieved for the concentrate.

To the material in the Kneader-Extruder, there was then added 750 gms of paraffin wax, having a melting point of 165° F. The contents were then mixed until a homogeneous state was achieved.

The percentage composition of the final hot melt coating compound was exactly the same as in Example 1.

Using a Brookfield Thermosel ® system, the melt viscosities of the final compound were determined at a temperature of 300° F. and a range of shear rates. The viscosity data are given in Table II:

Table II

| (Compound 605-68-LVI) | |
|---|---|
| Shear Rate (sec$^{-1}$) | Viscosity @ 300° F. (centipoise) |
| 0.17 | 720,000 |
| 0.34 | 370,000 |
| 0.85 | 144,000 |
| 1.7 | 85,000 |

FIG. 1 provides a vivid, graphic comparison of the viscosity data for Example 1, presented in Table I, with the data for Example 2, presented in Table II. Examination of FIG. 1 leaves no doubt as to the effectiveness of the mixing process employed in Example 1 wherein the pigment loading during the initial stage was 89%, as opposed to the initial pigment loading of 71% in Example 2. Dramatically lower viscosities were achieved through the use of the higher pigment loading in the initial mixing stage which created a condition of high shear.

EXAMPLE 3

Into a one gallon AMK Kneader-Extruder, heated to 250° F. with circulating hot water, there was initially charged at a gradual rate the following materials:

| Initial Charge | |
|---|---|
| 100 gms | Elvax ® 310 |
| 1500 gms | Titanox ® 2071 |
| 500 gms | Purecal ® SC |

The initial charge which contained 95%, by weight, of pigment, was mixed in the Kneader-Extruder for an additional 10 minutes after a homogeneous state had been achieved for the concentrate.

With the concentrate from the initial mixing stage still in the Kneader-Extruder, there was then added 650 gms of Elvax ® 310. Thereafter, 2250 gms of A-C ® 400 was added at a gradual rate so as to avoid the creation of two phases in the Kneader-Extruder. The contents were mixed until a homogeneous state was achieved and for 10 minutes thereafter. The percentage composition of the final compound was as follows:

| Purecal ® SC | 10% |
|---|---|
| Titanox ® 2071 | 30% |
| Elvax ® 310 | 15% |
| A-C ® 400 | 45% |
| | 100% |

Employing a Brookfield Thermosel ® system, the melt viscosities of the final compound were determined at 300° F. and a range of shear rates. The viscosity data are given in Table III:

Table III

| (Compound 605-105-V) | |
|---|---|
| Shear Rate (sec$^{-1}$) | Viscosity @ 300° F. (centipoise) |
| 0.465 | 18,000 |
| 0.93 | 15,500 |
| 2.33 | 15,000 |
| 4.65 | 12,000 |
| 9.3 | 11,000 |

EXAMPLE 4

Using the same one gallon AMK Kneader-Extruder employed in Example 3, wherein the Kneader-Extruder contained some residual material from a preceeding batch, the following materials were initially charged at a gradual rate of addition:

| Initial Charge | |
|---|---|
| 285 gms | Elvax ® 310 |
| 1500 gms | Titanox ® 2071 |
| 500 gms | Purecal ® SC |

The initial charge which contained 87.5%, by weight, of pigment was maintained in the Kneader-Extruder for 10 minutes beyond the point when a homogeneous state had been achieved for the concentrate.

To the concentrate there was thereafter added 465 gms of Elvax ® 310 and, thereafter there was added 2250 gms of A-C ® 400. The contents were again mixed for a period of 10 minutes beyond the achievement of a homogeneous state.

The percentage composition of the final coating compound was exactly the same as set forth in Example 3.

Using a Brookfield Thermosel ® system the melt viscosities of the final compound were determined at 300° F. and a range of shear rates. The viscosity data are given in Table IV:

Table IV

| (Compound 605-105-II) | |
|---|---|
| Shear Rate (sec$^{-1}$) | Viscosity @ 300° F. (centipoise) |
| 0.465 | 40,000 |
| 0.93 | 26,000 |
| 2.33 | 23,000 |
| 4.65 | 17,000 |
| 9.3 | 13,400 |

Figure 2:
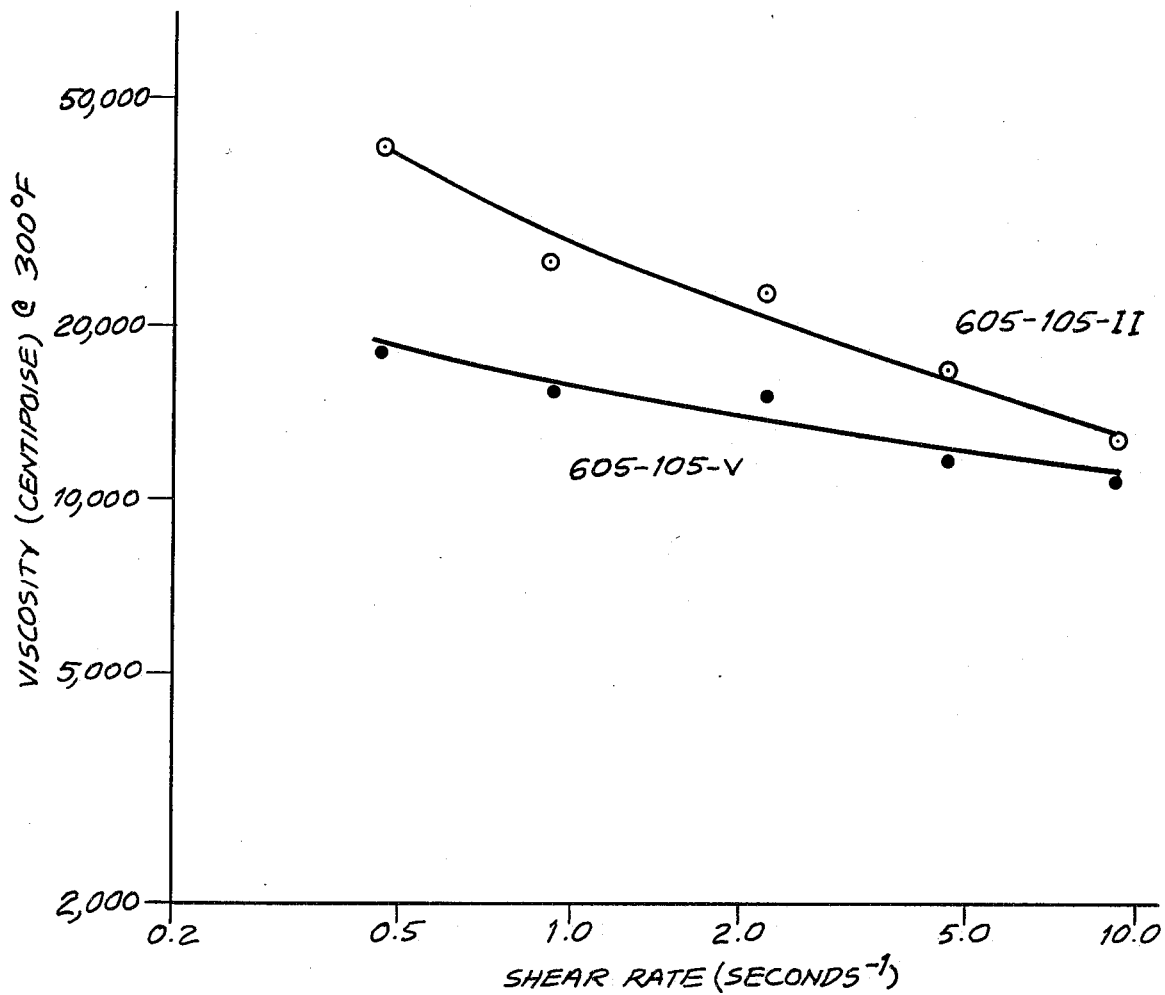
FIG. 2 is a graph of the viscosity versus shear rate data in Table III of Example 3 and Table IV of Example 4.

FIG. 2 provides a comparison of the viscosity data for Example 3, presented in Table III, with the data for Example 4, presented in Table IV. It will be noted that a 95% pigment loading in the initial stage of Example 3 results in a compound with uniformly lower viscosities at all shear rates than is obtained when the initial pigment loading is 87.5% in Example 4. These results demonstrate that the pigment loading in the initial mixing stage should be as high as possible in order to provide a finished product with the lowest possible viscosity.

EXAMPLE 5

The mixing device used in this Example is a fifteen gallon "Mixtruder" supplied by the J. H. Day Company of Cincinnati, Ohio. The Mixtruder very closely resembles the AMK Kneader-Extruder, a mixing device described in Example 1, in that it, too, is a double-arm, kneader-type batch mixer with a discharge auger at the bottom of the mixing chamber and with a jacket surrounding the mixing chamber for circulating heating or cooling fluids. In this example, heated oil at 275° F. was circulated through the jacket.

This particular batch of material is one of a series of batches, all of which have the same final composition and were prepared with a small amount of residual material from the preceding batch of the same series remaining in the mixer. The impracticality of dismantling and cleaning a mixing device of this type between successive batches has been discussed in Example 1. Also as in Example 1, while residual material has no effect on the final composition, it does affect the composition of the initial stage of mixing and it is to be understood that the composition given for the initial charge in this Example is an accurate account of only new material charged to the mixer. The exact composition of material present in the mixer at this time would be somewhat different due to the residue from the preceding batch.

The following materials were initially charged to the Mixtruder at a gradual rate:

| Initial Charge (as a dry pre-blend) | |
|---|---|
| 21 lbs. | Titanox ® 2071 |
| 7 lbs. | Purecal ® SC |

-continued

| Initial Charge (as a dry pre-blend) | |
|---|---|
| 2.8 lbs. | Elvax ® 310 |

The initial charge, which contained 90%, by weight, of pigment, was mixed in the Mixtruder for an additional ten minutes after a homogeneous state had been achieved for the concentrate.

With the concentrate from the initial mixing stage still in the Mixtruder, there was then added to it, first, 7.7 lbs. of Elvax ® 310, then 16 lbs. of A-C ® 400, followed by an additional 15.5 lbs of A-C ® 400, all added at a gradual rate over 25 minutes so as to avoid the creation of two phases in the Mixtruder. The contents were mixed until a homogeneous state was achieved and for ten minutes thereafter. The percentage composition for the final compound was as follows:

| | |
|---|---|
| Purecal ® SC | 10% |
| Titanox ® 2071 | 30% |
| Elvax ® 310 | 15% |
| A-C ® 400 | 45% |
| | 100% |

It will be noted that this composition is the same as the final composition of the compound described in Example 3.

Employing a Brookfield Thermosel ® system, the melt viscosities of the final compound were determined at 300° F. and a range of shear rates. The viscosity data are given in Table V:

Table V (Compound 605-132-B5)

| Shear Rate (sec$^{-1}$) | Viscosity @ 300° F. (Centipoise) |
|---|---|
| 0.465 | 15,000 |
| 0.93 | 13,000 |
| 2.33 | 14,300 |
| 4.65 | 10,400 |
| 9.3 | 9,600 |
| 18.6 | 8,900 |

The data shown in Table V are intended for comparison with the data in Table III. The data in these tables illustrate that similar rheological properties are attainable when a given composition is prepared in mixing machines which differ markedly in size, provided the pigmentation level is maintained at the highest level practical during the initial stage of mixing.

The rheological-character of the compound of this example is such that the compound can be successfully applied to paper substrates using roll-type hot-melt coating machinery. Coating trials performed on such a machine, specifically a PAK 600 from Maschinefabrik Max Kroenert in West Germany, have demonstrated that coating speeds over 800 ft/min. and coating weights as low as 1 lb./3000 ft$^2$ (1.6 gm/M$^2$) are feasible with this compound. The coating trials on the Kroenert machine provided a product with smooth, defect-free, opaque, white, high-gloss coatings which were readily printable via the offset process, and were also water resistant and heat sealable. In Table V-A below are listed the results obtained in seven coating trials wherein the coating speed ranged between 150 and 240 meters per minute and the temperature of the roll coater was 160° C.

Table V-A

| | Evaluation of Coated Product | | |
|---|---|---|---|
| Coating Trial No. | Coating Weight (gm/M$^2$) | Gloss (%) | Opacity (%) |
| 1 | 1.5 | 40.3 | 84.0 |
| 2 | 4 | 72.0 | 87.3 |
| 3 | 6 | 75.0 | 87.4 |
| 4 | 8 | 76.0 | 88.4 |
| 5 | 10 | 76.1 | 88.4 |
| 6 | 12 | 80.3 | 90.1 |
| 7 | 14 | 86.0 | 91.9 |
| Uncoated Rawstock* | 0 | 12.9 | 83.1 |

*The uncoated rawstock for these coating trials was a dullfinish 35 lb. white offset paper.

EXAMPLE 6

The compound in this Example was prepared in a fifteen gallon Mixtruder, the same mixer described in Example 5.

As in Example 5, this batch of material is also one of a series of batches all having the same final composition and prepared with a small amount of residual matter from the preceding batch remaining in the mixer. As explained in Example 5, this residue does not affect the final composition, but it does have an effect on the composition of the initial mixing stage.

With the jacket temperature at 275° F., the following materials were initially charged to the Mixtruder at a gradual rate:

| Initial Charge | |
|---|---|
| 48 lbs. | Titanox ® 2071 |
| 4 lbs. | Elvax ® 4310 |
| 2 lbs. | A-C ® 5120 |

Elvax ® 4310 is an ethylene-vinyl acetate-organic acid terpolymer from the DuPont Company and A-C ® 5120 is an ethylene-organic acid copolymer from Allied Chemical.

The initial charge, which contained 89%, by weight, of pigment, was mixed in the Mixtruder for an additional ten minutes after a homogeneous state had been achieved for the concentrate.

With the concentrate from the initial mixing stage still in the Mixtruder, there was then added to it, an additional 26 lbs. of A-C ® 5120 at a gradual rate over a period of 37 minutes so as to avoid the creation of two phases in the Mixtruder. The composition was mixed until a homogeneous state was achieved and for 10 minutes thereafter. The percentage composition for the final formulation was as follows:

| | |
|---|---|
| Titanox ® 2071 | 60% |
| Elvax ® 4310 | 5% |
| A-C ® 5120 | 35% |

Using the Brookfield Thermosel System, the melt viscosities of the final compound were determined at 250° F. and a range of shear rates. This data is shown below:

Table VI (Compound 605-188-7)

| Shear Rate (sec$^{-1}$) | Viscosity @ 250° F. (centipoise) |
|---|---|
| 0.17 | 28,000 |
| 0.34 | 28,000 |
| 0.85 | 30,000 |
| 1.70 | 36,000 |
| 3.40 | 30,500 |
| 6.80 | 23,250 |

The data given here are characteristic of an acceptable viscosity range which is easily handled and effectively applied by most commercial hot melt coating equipment.

EXAMPLE 7

As in Example 6, the compound in this Example was prepared in a fifteen gallon Mixtruder in the manner previously described. It was the final compound of the series that included Example 6, with all compounds of the series having the same finished composition.

With the jacket temperature at 275° F., the following materials were initially charged to the Mixtruder at a gradual rate:

| Initial Charge | |
|---|---|
| 48 lbs. | Titanox ® 2071 |
| 4 lbs. | Elvax ® 4301 |
| 16 lbs. | A-C ® 5120 |

The initial charge, which contained 70.6%, by weight, of pigment, was mixed in the Mixtruder for an additional fifteen minutes after a homogeneous state had been achieved for the concentrate.

With the concentrate from the initial mixing stage still in the Mixtruder, there was then added to it 12 lbs. of A-C ® 5120 at a gradual rate over a period of 5 minutes. The composition was mixed until a homogeneous state was achieved and for 10 minutes thereafter. The percentage composition for the final compound was exactly as set forth in Example 6.

Using the Brookfield Thermosel System, the melt viscosities of the final compound were determined at 250° F. and a range of shear rates. This data is shown below:

(Compound of 605-191)

| Shear Rate (sec$^{-}$) | Viscosity @ 250° F. (centipoise) |
|---|---|
| 0.125 | 2,060,000 |
| 0.25 | 1,090,000 |
| 0.625 | 464,000 |
| 1.25 | 268,000 |
| 2.50 | 158,000 |
| 5.0 | 93,000 |

Figure 3:
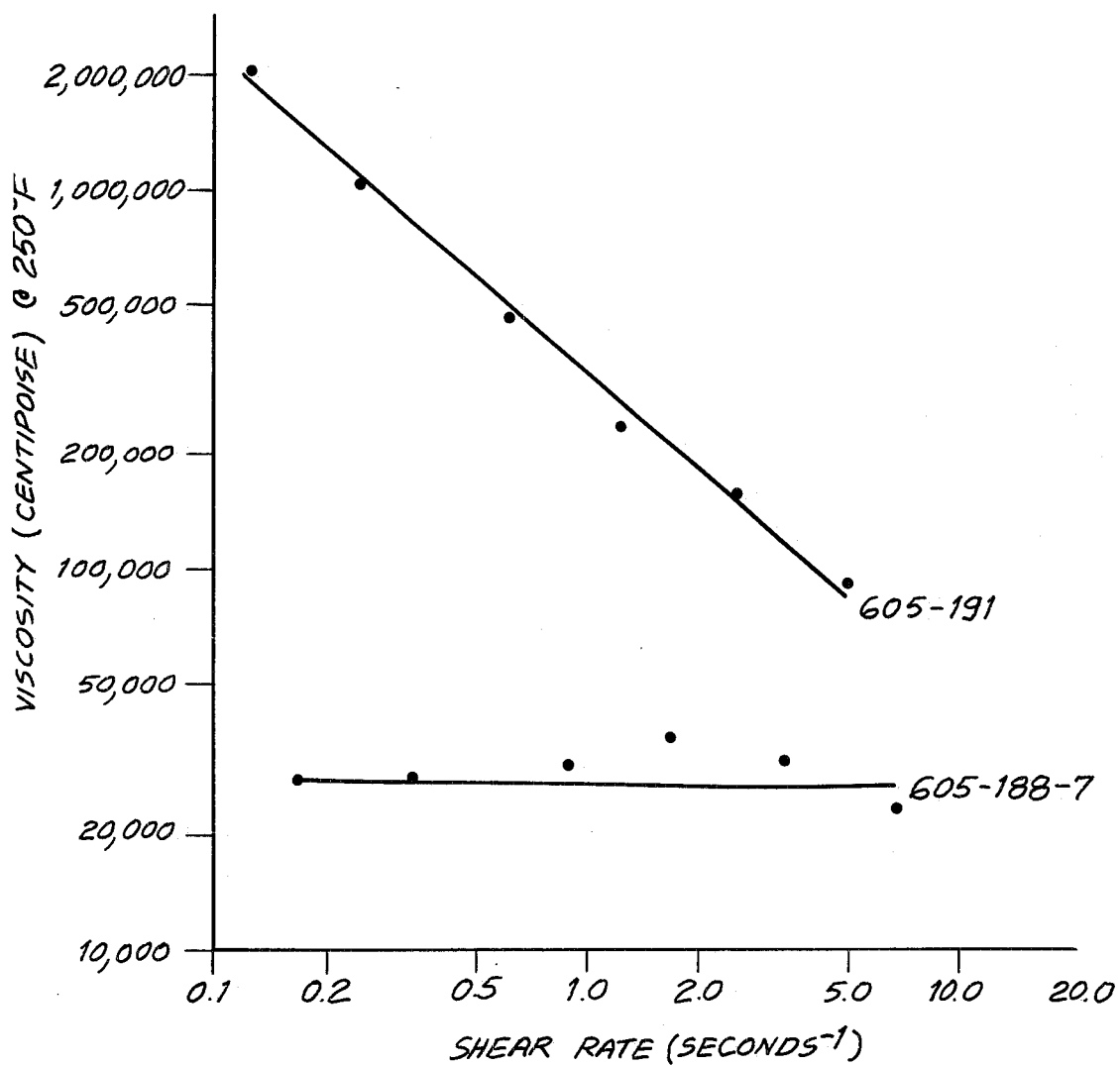
FIG. 3 is a graph of the viscosity versus shear rate data in Table VI of Example 6 and Table VII of Example 7.

FIG. 3 provides a comparison of the viscosity data for Example 6, presented in Table VI, with the data for Example 7, presented in Table VII. The advantage of the high pigment concentration employed in the initial stage of Example 6 becomes obvious upon examination of FIG. 3. The 89% pigment loading during the initial stage of Example 6 results in a final formulation with significantly lower viscosities than are obtained with the 71% initial pigment loading in Example 7.

The 15 gallon Mixtruder used in Examples 6 and 7 was equipped with a recording unit monitoring the horsepower input to the mixing blades. The maximum horsepower input during the mixing process occurs during the initial stage when the pigment concentration is highest. The mixing horsepower requirement for a particular compound can be described in terms of the peak horsepower demand during the initial stage. For the compound of Example 6, which was prepared in a manner that provided a pigment concentration of 89% during the initial stage, the peak horsepower demand was 12.6 hp. In contrast, the compound of Example 7, which had a pigment concentration of only 71% during the initial stage, had a peak horsepower demand of only 3.5 hp. This data emphasizes the difference between the high shear mixing during the initial stage of Example 6 and the relatively low shear mixing during the initial stage of Example 7.

EXAMPLE 8

Into a one gallon AMK Kneader-Extruder, heated to 250° F. with circulating hot water, there was initially charged, at a gradual rate, the following materials in the order indicated, which were then mixed for a period of one hour under the high shear condition created by the 80% pigment loading. The composition of batch 87-IA was:

| 87-IA | |
|---|---|
| AC-6a (polyethylene wax made by Allied Chemical | 20% |
| Kaopolite ® SFO (a surface-treated kaolin clay made by Georgia Kaolin) | 64% |
| Red Star Antimony Oxide (made by NL Industries) | 16% |
| | 100% |

After completing the one hour of mixing of the initial stage described above, there was added to the Kneader-Extruder an additional portion of AC-6a which was mixed during a second stage until a homogeneous state was achieved. The composition of 87-IB was:

| 87-IB | |
|---|---|
| AC-6a | 30% |
| Kaopolite ® SFO | 56% |
| Red Star Antimony Oxide | 14% |
| | 100% |

A weighed sample of 87-IB was removed for a viscosity determination, and thereafter, an additional portion of AC-6a was added and was mixed during a third stage until a homogeneous state was achieved. The composition of batch 87-IC was:

| 87-IC | |
|---|---|
| AC-6a | 40% |
| Kaopolite ® SFO | 48% |
| Red Star Antimony Oxide | 12% |
| | 100% |

A weighed sample of 87-IC was removed for a viscosity determination, and thereafter, an additional portion of AC-6a was added and mixed in the Kneader-Extruder during a fourth stage until a homogeneous state was achieved. The composition of batch 87-ID was:

| 87-ID | |
|---|---|
| AC-6a | 50% |
| Kaopolite ® SFO | 40% |
| Red Star Antimony Oxide | 10% |

-continued

| | |
|---|---|
| | 100% |

A weighed sample of 87-ID was removed, for a viscosity determination, and thereafter, an additional portion of AC-6a was added and mixed in the Kneader-Extruder during a fifth stage until a homogeneous state was achieved. The composition of batch 87-IE was:

87-IE

| | |
|---|---|
| AC-6a | 60% |
| Kaopolite ® | 32% |
| Red Star Antimony Oxide | 8% |
| | 100% |

A weighed sample of 87-IE was removed for a viscosity determination, and thereafter, in the sixth and final mixing stage, an additional portion of AC-6a was added to the Kneader-Extruder and mixed until a homogeneous state was achieved. The composition of batch 87-IF was:

87-IF

| | |
|---|---|
| AC-6a | 70% |
| Kaopolite ® SFO | 24% |
| Red Star Antimony Oxide | 6% |
| | 100% |

A sample of 87-IF was removed for a viscosity determination.

Using a Brookfield Thermosel System, the melt viscosities of samples 87-IB, 87-IC, 87-ID, 87-IE and 87-IF were determined at a temperature of 300° F. and range of shear rates. The viscosity data are given in Table VIII.

Table VIII

| Shear Rate | Viscosity @ 300° F. (centipose) | | | | |
|---|---|---|---|---|---|
| (sec⁻) | 87-IB | 87-IC | 87-ID | 87-IE | 87-IF |
| .17 | 780,000 | 205,000 | 50,000 | 12,500 | 6,500 |
| .34 | 410,000 | 115,000 | 28,000 | 8,750 | 3,750 |
| .85 | 185,000 | 57,000 | 14,000 | 4,500 | 2,500 |
| 1.70 | | 36,000 | 8,500 | 2,700 | 1,600 |
| 3.40 | | 24,000 | 5,350 | 1,750 | 1,000 |
| 6.80 | | 13,750 | 3,375 | 1,225 | 725 |
| 17.00 | | | 1,700 | 700 | 450 |
| 34.00 | | | 1,100 | 550 | 375 |

EXAMPLE 9

The experiment described herein was designed to determine the intermediate and final viscosities achieved when the pigment concentration during the initial stage of the mixing process was only 70% and to compare them with the viscosities achieved in Example 8 where the initial pigment concentration was 80%. In these examples the compositions of the final compounds were identical.

Into a one gallon AMK Kneader-Extruder, heated to 250° F. with circulating hot water, there was initially charged at a gradual rate, the following materials in the following order, which were then mixed to the point of homogeneity. The composition of batch 87-IIA was as indicated below:

87-IIA

| | |
|---|---|
| AC-6a | 30% |
| Kaopolite ® SFO | 56% |

87-IIA-continued

| | |
|---|---|
| Red Star Antimony Oxide | 14% |
| | 100% |

Note that the composition of batch 87-IIA is identical to that of batch 87-IB.

A weighed sample of 87-IIA was removed for a viscosity determination, and thereafter, an additional portion of AC-6a was added and was mixed during a second stage until a homogeneous state was achieved. The composition of batch 87-IIB was as indicated below:

87-IIB

| | |
|---|---|
| AC-6a | 40% |
| Kaopolite ® SFO | 48% |
| Red Star Antimony Oxide | 12% |
| | 100% |

Note that the composition of batch 87-IIB is identical to that of batch 87-IC.

A weighed sample of 87-IIB was removed for a viscosity determination, and thereafter, an additional portion of AC-6a was added and mixed during a third stage until a homogeneous state was achieved. The composition of batch 87-IIC was as indicated below:

87-IIC

| | |
|---|---|
| AC-6a | 50% |
| Kaopolite ® SFO | 40% |
| Red Star Antimony Oxide | 10% |
| | 100% |

Note that the composition of batch 87-IIC is identical to that of batch 87-ID.

A weighed sample of 87-IIC was removed for a viscosity determination, and thereafter, there was added yet another additional portion of AC-6a and the contents were mixed in a fourth stage until a homogeneous state was achieved. The composition of batch 87-IID was as indicated below:

87-IID

| | |
|---|---|
| AC-6a | 60% |
| Kaopolite ® SFO | 32% |
| Red Star Antimony Oxide | 8% |
| | 100% |

Note that the composition of batch 87-IID is identical to that of batch 87-IE.

A weighed sample of 87-IID was removed for a viscosity determination, and thereafter, in the fifth and final mixing stage, an additional portion of AC-6a was added to the Kneader-Extruder and mixed until a homogeneous state was achieved. The composition of batch 87-IIE was as indicated below:

87-IIE

| | |
|---|---|
| AC-6a | 70% |
| Kaopolite ® SFO | 24% |
| Red Star Antimony Oxide | 6% |
| | 100% |

Note that the composition of batch 87-IIE is identical to that of batch 87-IF.

A sample of 87-IIE was removed for a viscosity determination.

Using a Brookfield Thermosel system, the melt viscosities of samples 87-IIA, 87-IIB, 87-IIC, 87-IID and 87-IIE were determined at a temperature of 300° F. and a range of shear rates. The viscosity data are given in Table IX.

Table IX

| Shear Rate | Viscosity @ 300° F. (centipoise) | | | | |
|---|---|---|---|---|---|
| (sec$^{-1}$) | 87-IIa | 87-IIB | 87-IIC | 87-IID | 87-IIE |
| .125 | 2,240,000 | | | | |
| .170 | | 315,000 | 100,000 | 35,000 | 16,000 |
| .250 | 1,220,000 | | | | |
| .340 | | 175,000 | 56,250 | 18,750 | 8,750 |
| .625 | 536,000 | | | | |
| .850 | | 85,000 | 26,500 | 9,000 | 4,200 |
| 1.25 | 308,000 | | | | |
| 1.70 | | 51,000 | 15,500 | 5,300 | 2,650 |
| 2.50 | 160,000 | | | | |
| 3.40 | | 30,000 | 8,500 | 3,250 | 1,625 |
| 5.00 | 90,000 | | | | |
| 6.80 | | 16,750 | 5,500 | 2,000 | 1,000 |
| 17.00 | | | 3,000 | 1,200 | 660 |
| 34.00 | | | 2,000 | 900 | 550 |

Figure 4:
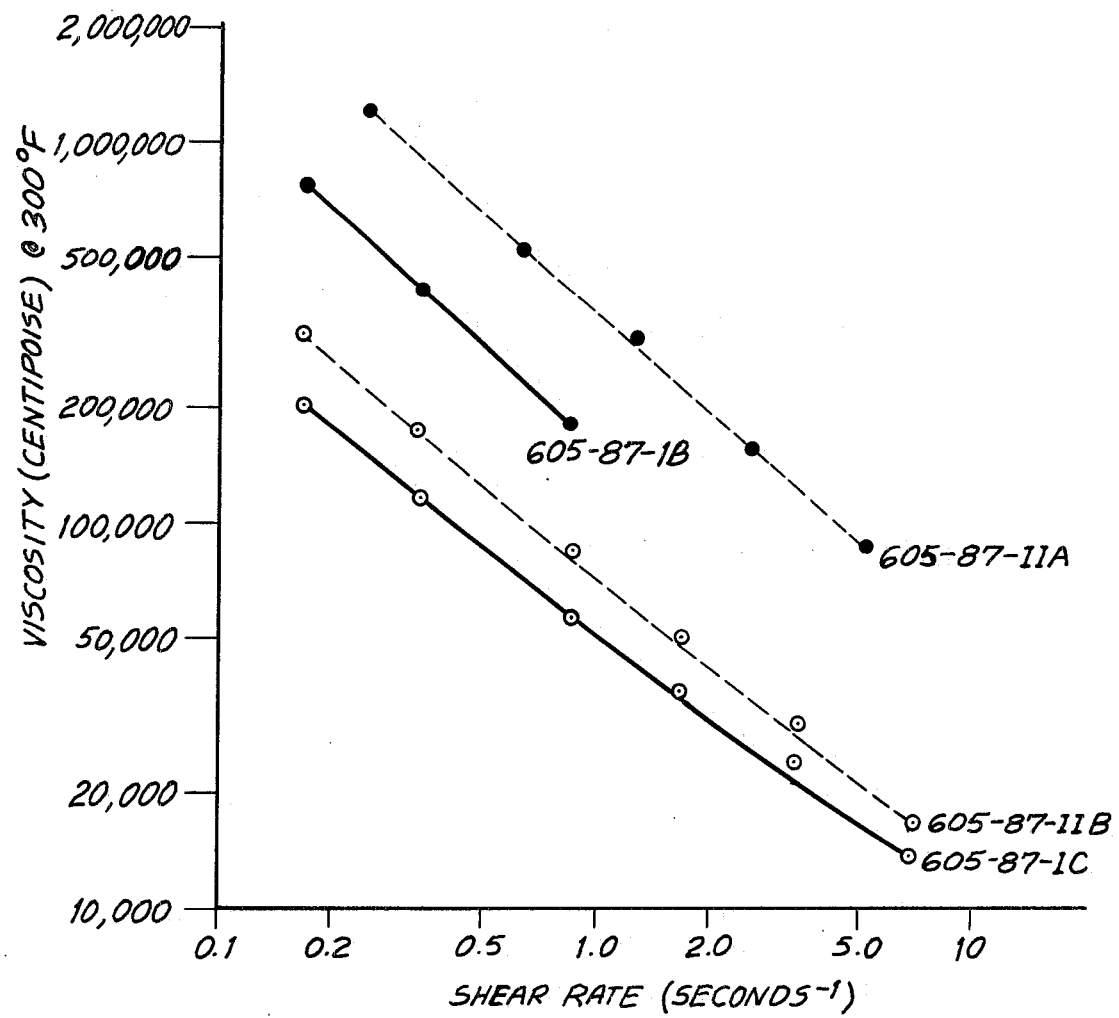
FIGS. 4 and 5 are graphs of the viscosity versus shear rate data in Table VIII of Example 8 and Table IX of Example 9.
Figure 5:
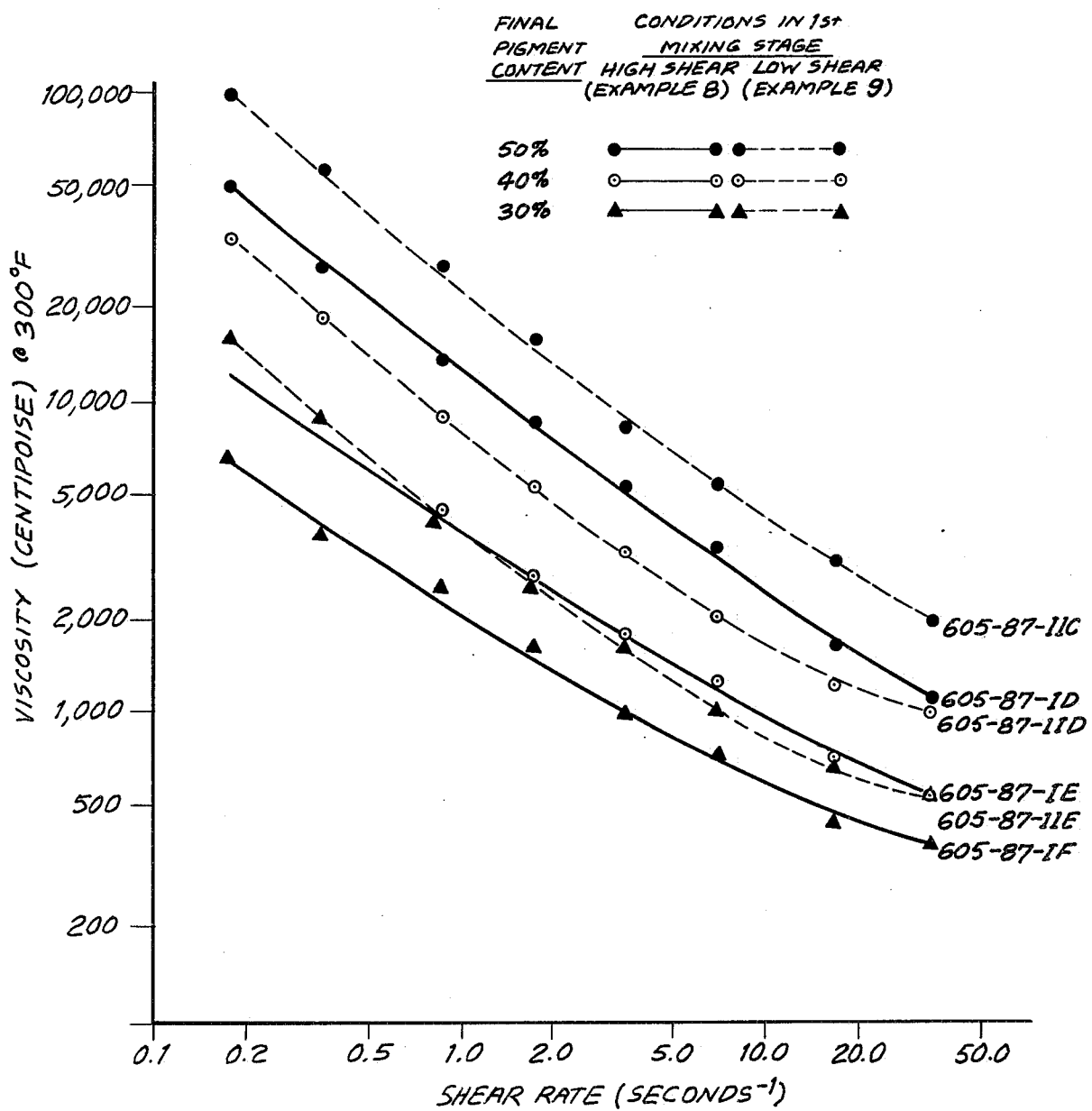

The viscosity data in Table IX are compared with the data in Table VIII in FIGS. 4 and 5. It can be seen by examining these figures that in each and every instance the compounds from Example 8 have lower viscosities than the compounds of identical composition from Example 9. That is, batch 87-IB is less viscous than 87-IIA although these batches have identical compositions. Likewise, batch 87-IC is less viscous than 87-IIB, etc. The consistently lower viscosities in Example 8 are attributable to the high shear condition developed by the 80% pigment loading of batch 87-IA, the precursor of all the other batches in Example 8. In contrast, in Example 9 the highest shear conditions are those developed by the 70% pigment loading in batch 87-IIA, the initial batch in the series.

EXAMPLE 10

In this example and Example 11 which follows the mixing device is a 350 ml.-capacity "Prep-Mixer" supplied by C. W. Brabender Instruments. The Prep-Mixer is an intensive mixing device consisting of a heavy chamber housing a pair of roller-type mixing blades driven by a 5 hp motor. The inside of the chamber conforms approximately with the shape of the mixing blades so that most of the internal volume of the chamber is taken up by the blades. The chamber is designed for heating with circulating hot oil.

For this example the Prep-Mixer was heated to 200° F. as the following materials, comprising batch 92-IA, were charged into the mixer gradually in the order given:

92-IA

| | |
|---|---|
| M5-W (amorphous polypropylene made by Eastman Chemical) | 17.75% |
| Microcrystalline Wax | 8.75% |
| Purecal ® "O" (untreated calcium carbonate made by BASF Wyandotte) | 65.00% |
| Talc MP 1250 (made by Pfizer) | 8.50% |
| | 100.00% |

Batch 92-IA was mixed at 200° F. for 1.5 hours under the high shear conditions created by the 73.5% pigment loading. Thereafter there were added amounts of M5-W and microcrystallinewax sufficient to reduce the pigment content to 50%. The composition of batch 92-IB was as follows:

92-IB

| | |
|---|---|
| M5-W | 25% |
| Microcrystalline Wax | 25% |
| Purecal ® "O" | 44% |
| Talc MP 1250 | 6% |
| | 100% |

Batch 92-IB was then mixed for 1.5 hours at 200° F. and then there was added an amount of Zonarez ® B-85 (a polyterpene resin made by Arizona Chemical) sufficient to reduce the pigment concentration to 36%. The composition of batch 92-IC was as follows:

92-IC

| | |
|---|---|
| M5-W | 18.5% |
| Microcrystalline Wax | 18.5% |
| Zonarez B-85 | 27.0% |
| Purecal ® "O" | 31.7% |
| Talc MP 1250 | 4.3% |
| | 100.0% |

The temperature of the mixer was raised to 300° F. during the addition of the Zonarez resin. Thereafter, the temperature was lowered again to 200° F. and batch 92-IC was mixed for an additional 20 minutes.

A sample of 92-IC was removed and its melt viscosity determined at various shear rates using a Brookfield Thermosel system at 300° F. The viscosity data are shown below in Table X.

Table X

| 92-IC | |
|---|---|
| Shear Rate (sec$^{-1}$) | Viscosity @ 300° F. (cps) |
| .17 | 30,000 |
| .34 | 20,000 |
| .85 | 9,000 |
| 1.70 | 5,000 |
| 3.40 | 2,500 |
| 6.80 | 1,625 |
| 17.00 | 1,150 |
| 34.00 | 1,000 |

EXAMPLE 11

The experiment described here was designed to determine the final viscosity achieved in a multi-stage mixing sequence where the initial pigment concentration was only 50% and to compare it with the final viscosity achieved in Example 10 where the initial pigment concentration was 73.5%

For this example the Prep-Mixer was preheated to 200° F. and the following materials, comprising batch 92-IIA, were charged into the mixer gradually in the order given:

92-IIA

| | |
|---|---|
| M5-W | 25% |
| Microcrystalline Wax | 25% |
| Purecal ® "O" | 44% |
| Talc MP 1250 | 6% |
| | 100% |

Batch 92-IIA was mixed at 200° F. until homogeneity was achieved under the low shear conditions created by the pigment loading of only 50.0%. Thereafter the temperature of the mixer was increased to 300° F. and there was added an amount of Zonarez ® B-85 sufficient to reduce the pigment concentration to 36%. The composition of batch 92-IIB was as follows:

92-IIB

| | |
|---|---|
| M5-W | 18.5% |
| Microcrystalline Wax | 18.5% |
| Zonarez B-85 | 27.0% |
| Purecal ® "O" | 31.7% |
| Talc MP 1250 | 4.3% |
| | 100.0% |

Following addition of the Zonarez ® resin, the temperature of the mixer was lowered to 200° F. and batch 92-IIB was mixed for an additional 30 minutes.

A sample of 92-IIB was removed and its melt viscosity was determined at various shear rates using a Brookfield Thermosel system at 300° F. The viscosity data are shown below in Table XI.

Table XI

| Shear Rate (sec$^{-1}$) | Viscosity @ 300° F. (cps) |
|---|---|
| .17 | 57,500 |
| .34 | 32,500 |
| .85 | 16,000 |
| 1.70 | 10,000 |
| 3.40 | 6,000 |
| 6.80 | 4,000 |
| 17.00 | 2,400 |
| 34.00 | 1,850 |

Figure 6:
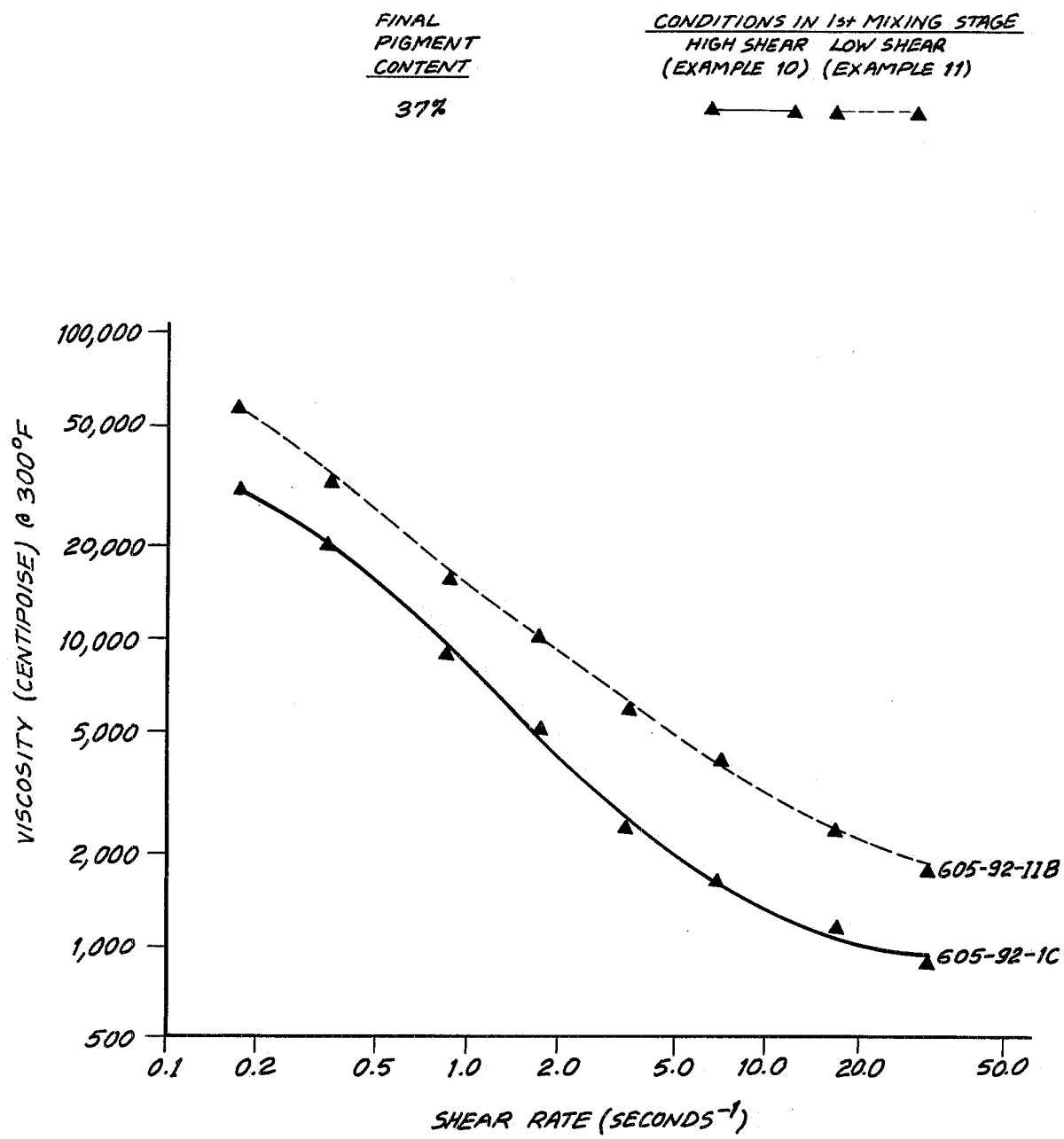
FIG. 6 is a graph of the viscosity versus shear rate data in Table X of Example 10 and Table XI of Example 11.

FIG. 6 is a graphical representation of the data tabulated in Tables X and XI. This figure provides a comparison of compounds 92-IC and 92-IIB which have the same final composition, but which were prepared under different conditions of shear during the initial mixing stage. Compound 92-IC, prepared under the relatively high shear condition induced by a 73.5% pigment loading in the initial stage, is characterized by significantly lower viscosities than compound 92-IIB, which was prepared under the relatively low shear condition associated with an initial pigment loading of only 50%.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for preparing in two or more stages a flowable, nonaqueous, solvent-free, highly pigmented, low viscosity, thermoplastic, hot-melt coating compound, which comprises the steps of:

(a) mixing in an initial stage from about 70% to about 95%, by weight, of pigment with from about 5% to about 30%, by weight, of a low viscosity thermoplastic binder material selected from the group consisting of polyethylene, ethylene-vinyl acetate copolymers, ethylene-organic acid copolymers, ethylene-vinyl acetate-organic acid terpolymers, polypropylene, polystyrene, polyamides, paraffin wax, microcrystalline wax, polyterpene resins, and mixtures thereof, having a melt viscosity less than about 100,000 centipoises at a temperature in the range of from about 250° F. to about 300° F. and at a shear rate of from about 0.2 to about 2.0 reciprocal seconds for a period of time sufficient to obtain a homogeneous concentrate; and (b) mixing in one or more subsequent stages the homogeneous concentrate of step (a) with sufficient additional amounts of low viscosity thermoplastic binder material selected from the group consisting of polyethylene, ethylene-vinyl acetate copolymers, ethylene-organic acid copolymers, ethylene-vinyl acetate-organic acid terpolymers, polypropylene, polystyrene, polyamides, paraffin wax, microcrystalline wax, polyterpene resins, and mixtures thereof, to yield a final homogeneous, flowable hot melt coating compound having a melt viscosity less than about 200,000 centipoises at a temperature in the range of about 250° F. to about 300° F. and at a shear rate of from about 0.2 to about 2.0 reciprocal seconds and comprising from about 30% to about 70%, by weight of pigment and from about 30% to about 70%, by weight, of low viscosity thermoplastic binder material.

2. A process in accordance with claim 1 wherein the pigment is selected from the group consisting of titanium dioxide, calcium carbonate, clays, zinc oxide, antimony oxide, talc, silica, and mixtures thereof.

3. A process in accordance with claim 1 wherein the pigment is titanium dioxide.

4. A process in accordance with claim 1 wherein the low viscosity thermoplastic binder material is polyethylene.

5. A process in accordance with claim 1 wherein the low viscosity thermoplastic binder materials are ethylene-vinyl acetate copolymers.

6. A process in accordance with claim 1 wherein the melt viscosity of the hot-melt coating compound is less than about 50,000 centipoises at a temperature in the range of about 250° F. to about 300° F. and at a shear rate of from about 0.2 to about 2.0 reciprocal seconds.

* * * * *